(No Model.) 2 Sheets—Sheet 1.

T. C. BARRACLOUGH & T. T. HEATON.
BUNG, VALVE, OR STOPPER, &c.

No. 505,587. Patented Sept. 26, 1893.

WITNESSES
Fred White
C. K. Fraser.

INVENTORS:
Thomas Critchley Barraclough,
and Thomas Tennett Heaton,
By their Attorneys
Arthur O. Fraser & Co.

(No Model.) 2 Sheets—Sheet 2.

T. C. BARRACLOUGH & T. T. HEATON.
BUNG, VALVE, OR STOPPER, &c.

No. 505,587. Patented Sept. 26, 1893.

WITNESSES:
Fred White
C. K. Fraser

INVENTORS:
Thomas Critchley Barraclough,
and Thomas Jannett Heaton,
By their Attorneys:
Arthur C. Fraser & Co.

UNITED STATES PATENT OFFICE.

THOMAS C. BARRACLOUGH AND THOMAS T. HEATON, OF LONDON, ENGLAND.

BUNG, VALVE, OR STOPPER, &c.

SPECIFICATION forming part of Letters Patent No. 505,587, dated September 26, 1893.

Application filed March 1, 1893. Serial No. 464,171. (No model.)

*To all whom it may concern:*

Be it known that we, THOMAS CRITCHLEY BARRACLOUGH and THOMAS TANNETT HEATON, of London, England, have invented certain new and useful improvements in bungs, valves, or stoppers and their seatings or holes and means for sealing them when closed, of which the following is a specification.

The object of our invention is to construct bungs, valves or stoppers and their seatings or holes in such manner that the contents of casks, barrels, drums, tanks or other like vessels which are provided with said bungs, valves or stoppers, and said seatings or holes can be rapidly and effectually secured by means of said bungs, valves or stoppers, and when required, sealed, and that the bungs, valves or stoppers can be rapidly removed when desired.

Our invention comprises first an internally screw threaded bush made in a piece with or secured or affixed to the cask or vessel, in combination with a conical valve seat beyond the screw of said bush; secondly, a hollow or tubular screw threaded nut adapted to screw into the bush, above described and having two or more internal projections adapted to engage when required with the back of a conical valve; thirdly, a conical valve adapted to fit the conical seat above described and having at its edge two or more gaps or recesses to enable it to pass the internal projections of said hollow nut, but only when the said gaps are in line with said projections; fourthly, means whereby said tubular nut can be secured to said bush and sealed with lead or otherwise.

Figure 1:
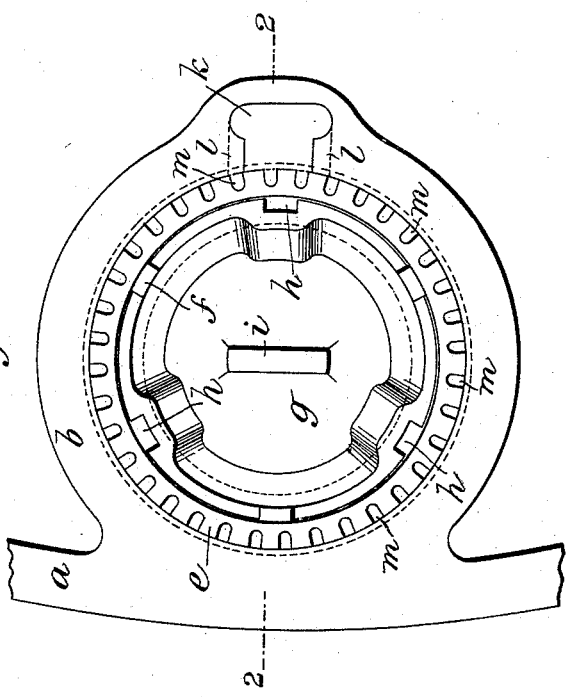
Figure 3:
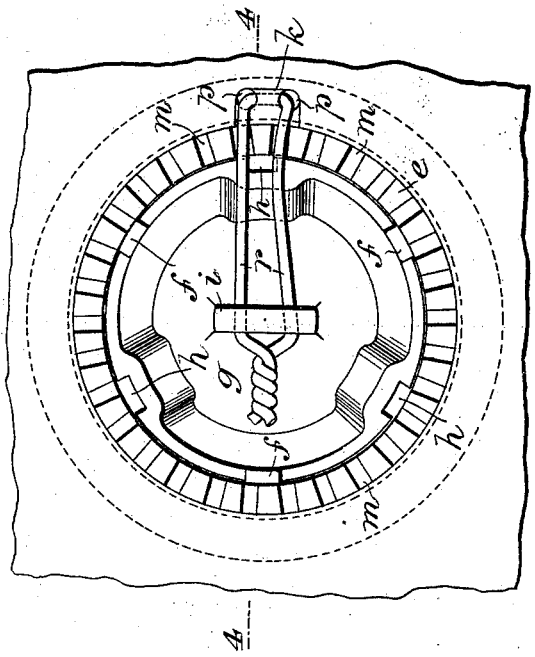

In the accompanying drawings: Figure 1 is a plan and Fig. 2 a section on line 2—2 of Fig. 1 of a bung, valve or stopper and bunghole or seating for same, and means of sealing it constructed according to our invention and showing its application to the outside of the end or head of a metal cask to which the bush is welded. Fig. 3 is a plan and Fig. 4 a section on line 4—4 of Fig. 3, illustrating the application of our bung, valve or stopper, bunghole or seating and means of sealing, to the body of a metal cask to the inside of which the bush is applied. The means of sealing shown in these figures differ somewhat from the means shown in Figs. 1 and 2. Fig. 5 is a plan and Fig. 6 a section on line 6—6 of Fig. 5 illustrating the application of our bung, valve or stopper and bunghole or seating to a wooden cask. No means of sealing are shown in these figures. Fig. 7 is a side elevation and Fig. 8 a back elevation of a faucet or tap one end of which is in the form of a conical valve adapted for use in combination with the bushes and hollow nuts shown in Figs. 1 to 6.

Figure 2:
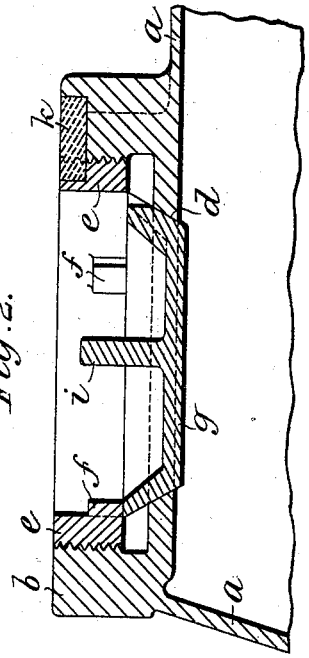

Referring first to Figs. 1 and 2, $a\ a$ represent the metal barrel. $b$ is a boss welded to the outside of the barrel end. The boss $b$ is cut with an internal screw thread for a portion of its length so as to constitute a bush. $d$ is a conical valve seat formed in the end of the cask concentric with and fixed relatively to the bush $b$. $e$ is a hollow or tubular screw threaded nut adapted to engage with the screw thread of the bush $b$. It is formed with three internal projections $f f f$. $g$ is a conical valve adapted to fit the seat $d$ and having at its edge as many gaps or recesses $h\ h\ h$ as there are projections $f f f$ in the tubular nut $e$. $i$ is a shank projecting from the back of the valve $g$; $k$ is a recess of a sort of dovetail form in plan cut in the top of the bush $b$ and extending to the internal edge of the said bush; this recess is undercut as indicated by the dotted lines $l\ l$ in Fig. 1. $m\ m\ m$ are notches, preferably radial, as shown, extending all round the top or outer edge of the hollow screw $e$.

The operations of closing and opening the bung-hole are as follows:—In order to close the bung-hole the hollow nut $e$ having been screwed into the bush $b$ until it is nearly at the normal or closing position, the valve $g$ is next passed through the nut its gaps $h\ h\ h$ passing over the projections $f f f$ until the valve rests on the conical seat $d$. The nut $e$ is then given a partial revolution (by means of a key or otherwise) in which movement the projections $f f f$ engage with the back of the valve and at the same time press it down upon its seat, thereby effectually closing the bung hole of the cask. In order to seal the bung and thereby prevent fraudulent abstraction of the contents of the cask molten lead or other suitable material is run into the recess $k$ and into those of the notches $m$ which happen to be opposite said recess so as to fill them, and the lead or other material may then be impressed or stamped with a seal or other device. The nut $e$ cannot be turned to loosen the valve without breaking the seal. In order to open the bunghole the seal is broken and the nut $e$ is given a partial turn in the reverse direction to that given to it in the closing action; the valve $g$ is thus released and it is then turned around by means of the shank $i$ until its gaps $h$ come opposite the projections $f$ in the nut. The valve can then be withdrawn leaving the bunghole unobstructed. It will readily be understood that by the arrangement described the full effect of the pressure due to the screw thread is obtained while at the same time its wearing surface is protected and the valve can be rapidly closed or released with a very slight movement of the hollow nut.

Figure 4:
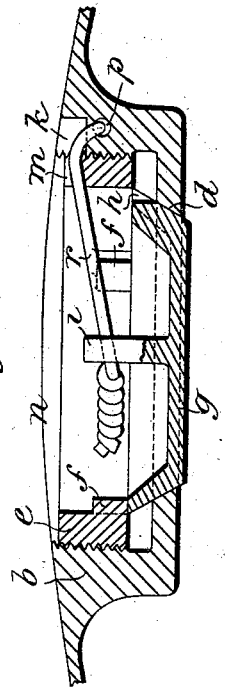
Figure 5:
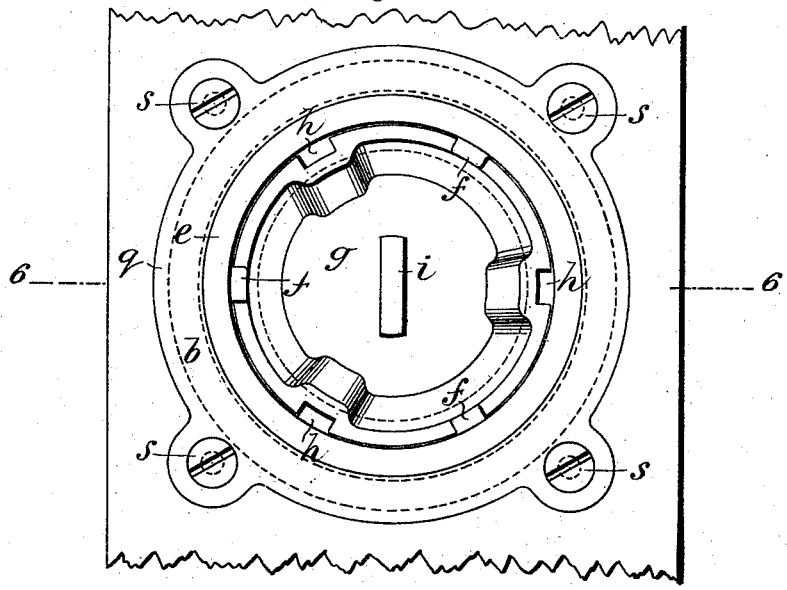

The arrangement shown in Figs. 3 and 4 differs from that shown in Figs. 1 and 2 in that the boss $b$ is at the inside of the body of the cask, the valve seat $d$ being cut in the inner end of the boss and a hole $n$ cut in the cask body. These figures also show a modified way of sealing the bung. In this modification two holes $p$ $p$ are formed in the boss $b$ below the recess $k$ the holes being at an angle so as to meet at their lower end. The radial notches $m$ $m$ extend quite across the top edge of the hollow nut $e$ and two holes are formed in the valve shank $i$. A wire or cord $r$ is passed through the holes $p$ $p$ and its two ends are then led through two of the notches $m$ and through the holes in the shank $i$. The ends are then twisted or tied tightly together as shown, and secured from being tampered with by means of a lead or other seal being affixed to the wire or cord.

Figure 6:
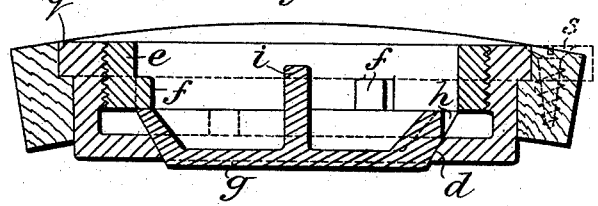
Figure 7:
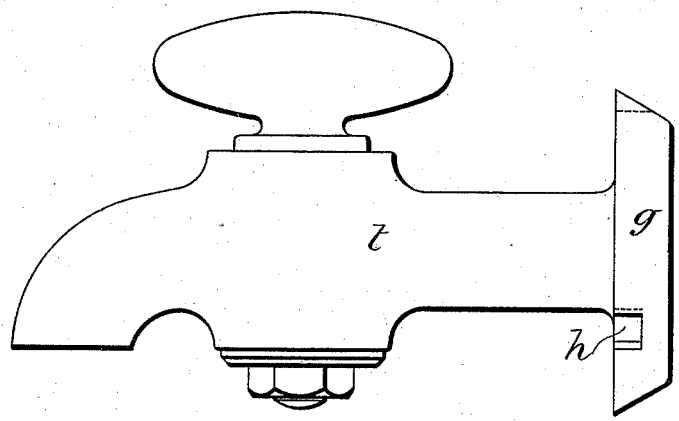

The arrangement shown in Figs. 5 and 6 is the same as that shown in Figs. 3 and 4 except that the devices for use in sealing are omitted and the boss or bush $b$ is flanged at $q$ to rest in a corresponding recess in the body of the cask, which is of wood, the boss $b$ being secured thereto by screws $s$ $s$.

Figure 8:
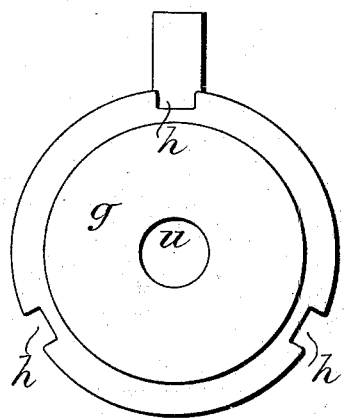

Although the invention has been specially designed for casks, drums and other like vessels it can also be adapted to other purposes where ready means of closing and opening a hole or aperture are desirable. Figs. 7 and 8 show for example how the invention can be used in connection with a faucet or tap. The conical valve $g$ is carried by the rear end of the faucet $t$ which takes the place of the shank $i$ in Figs. 1 to 6; the valve is used in combination with a bush, hollow screw threaded nut and valve seat the same as those shown in Figs. 1 and 6 and has an aperture $u$ to allow of the egress of the liquid.

The shape, size and number of the projections $f$ in the nut $e$ and of the gaps $h$ in the valve $g$ may of course be greatly varied. It is enough that in one position of the valve relatively to the screw the former can pass down or up the inside of the nut, while in another position it cannot pass either down or up it.

What we claim, and desire to secure by Letters Patent, is—

1. For closing or opening a bung hole or other aperture a fixed internally threaded bush, and a fixed valve seat, in combination with a valve fitting and engaging said seat, and a hollow screwthreaded nut fitting and engaging the screw threads of said bush, said nut having projections which when in one position relatively to said valve give passage to the valve, and when in another position relatively to said valve engage with and hold said valve on said seat, whereby the valve can be passed through said nut to the valve seat, and can be engaged and held down upon the seat by said nut when a partial turn is given to the latter in one direction, and when the nut is given a partial turn in the reverse direction the valve is released and can be withdrawn through the said hollow nut, all substantially as set forth.

2. In a stopper, a screwthreaded bush, and a valve seat fixed relatively thereto, in combination with the hollow screwthreaded nut $e$ engaging said bush and having projections $f$ $f$, and the valve $g$ having corresponding gaps $h$ $h$, said valve movable through said nut when in one position and engaged thereby when in another position, and when so engaged held by said nut against said seat, substantially as set forth.

3. In a stopper, a screwthreaded bush, and a valve seat fixed relativley thereto, in combination with the hollow screwthreaded nut $e$ engaging said bush and having projections $f$ $f$, and the valve $g$ having corresponding gaps $h$ $h$, said valve movable through said nut when in one position and engaged thereby when in another position, and when so engaged held by said nut against said seat, said valve having also the shank $i$ projecting within said hollow nut, substantially as and for the purpose set forth.

4. In a stopper, a screwthreaded bush $b$ having a recess $k$ at top, a valve seat, and a valve engaging said seat in combination with a screwthreaded nut entering and engaging the screwthreads of said bush holding said valve on said seat and having notches $m$ $m$ in its top edge coinciding with said recess in said bush, substantially as and for the purpose set forth.

5. In a stopper, a screwthreaded bush $b$, having a recess $k$ at top, a valve seat, and a valve engaging said seat and the under cuts $l$ $l$ in said recess, in combination with a screwthreaded nut holding said valve on said seat entering and engaging the screwthreads of said bush and having notches $m$ $m$ in its top edge coinciding with said recess and said undercuts in said bush, substantially as and for the purpose set forth.

In witness whereof we have hereunto signed our names in the presence of two subscribing witnesses.

THOMAS C. BARRACLOUGH.
THOMAS T. HEATON.

Witnesses:
THOMAS L. WHITEHEAD,
WILLIAM O. TANNETT.